United States Patent [19]

Williams

[11] 4,182,309
[45] Jan. 8, 1980

[54] CONTROL CIRCUIT FOR SOLAR ENERGY HEATING SYSTEMS

[76] Inventor: Theodore R. Williams, 1927 Clifton, Royal Oak, Mich. 48073

[21] Appl. No.: 877,020

[22] Filed: Feb. 13, 1978

[51] Int. Cl.² .................................................. F24J 3/02
[52] U.S. Cl. ................................... 126/422; 126/400; 165/18; 236/78 B; 236/91 F
[58] Field of Search .................... 126/271, 270, 400; 237/1 A; 165/18, 47; 236/91 F, 78 B

[56] References Cited

U.S. PATENT DOCUMENTS

| | | | |
|---|---|---|---|
| 3,388,860 | 6/1968 | Kruper | 236/78 B |
| 3,747,849 | 8/1973 | Heierli | 236/91 F |
| 3,931,806 | 1/1976 | Hayes | 126/400 |
| 3,986,489 | 10/1976 | Schlesinger | 126/271 |
| 3,998,207 | 12/1976 | Watt | 126/271 |
| 4,010,734 | 3/1977 | Chayet | 126/271 |
| 4,019,495 | 4/1977 | Frazier | 126/271 |
| 4,116,219 | 9/1978 | Nurnberg | 126/271 |

Primary Examiner—Samuel Scott
Assistant Examiner—Daniel J. O'Connor
Attorney, Agent, or Firm—Barnes, Kisselle, Raisch & Choate

[57] ABSTRACT

A control circuit for a solar energy heating system comprising a pair of thermistors connected in series across a source of electrical power and respectively disposed to be responsive to fluid temperature in a solar collector and in a storage tank. A negative feedback high frequency oscillator which includes a Schmitt trigger is connected to the junction of the thermistors and provides a high frequency control signal having an amplitude which varies as a function of the temperature differential between the collector and tank. An electronic switch energizes a fluid pump for transporting fluid from the solar collector to the tank when the temperature at the collector exceeds that at the tank by a preselected amount.

8 Claims, 1 Drawing Figure

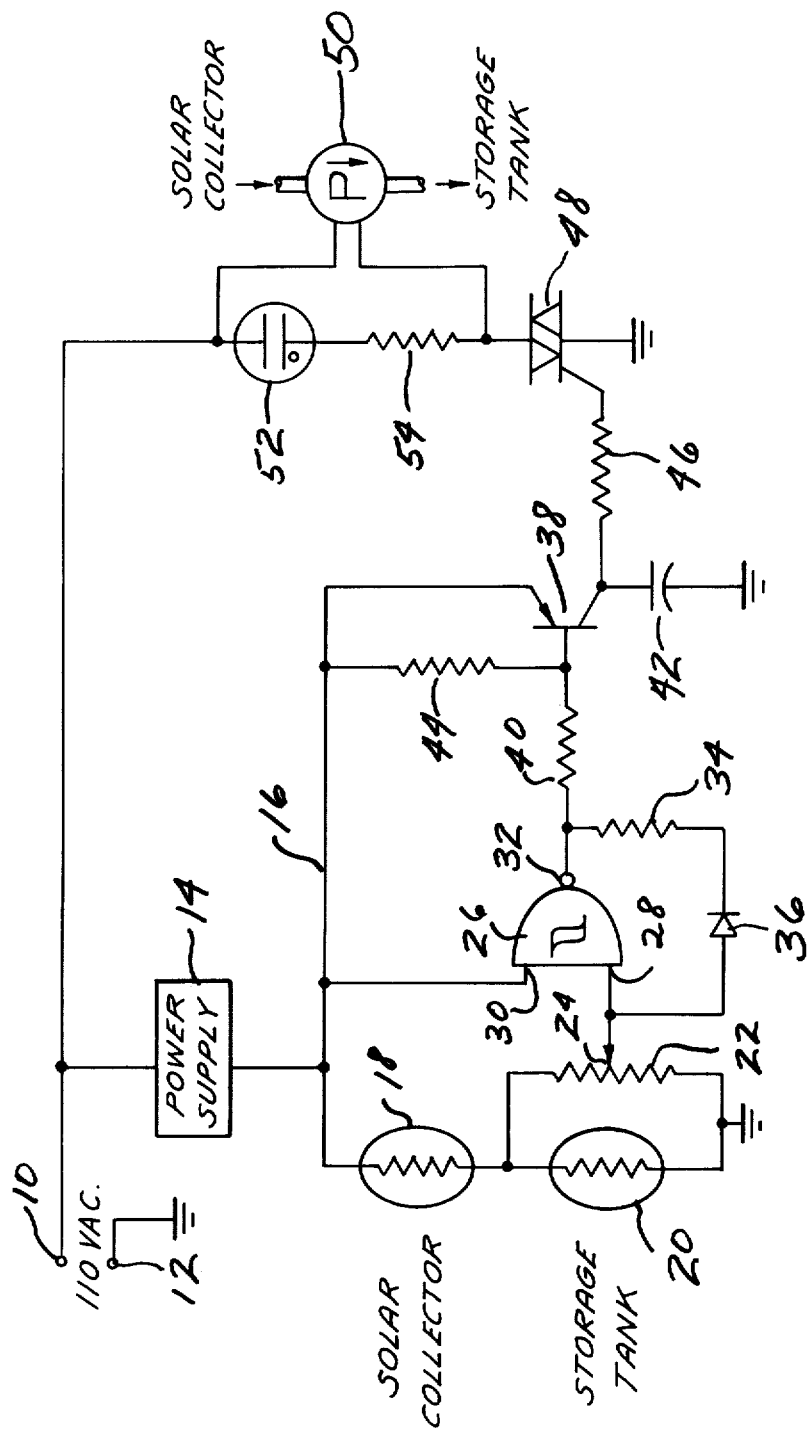

CONTROL CIRCUIT FOR SOLAR ENERGY HEATING SYSTEMS

The present invention relates to circuits for controlling electrical apparatus as a function of a temperature differential between first and second locations, and more particularly to a circuit for controlling energy transfer fluid transport in a solar energy heating system.

Objects of the present invention are to provide a circuit which is specifically adapted for controlling the fluid pump in a solar energy heating system to transport fluid from the solar collector to a remote location such as a storage tank or the like only when the fluid in the collector is warmer than that at the remote location, and which is economical to assembly yet reliable in long term operation.

The invention, together with additional objects, features and advantages thereof, will be best understood from the following description, the appended claims, and the accompanying drawing which is a schematic diagram of the presently preferred embodiment of the control circuit provided by the invention.

Referring to the drawing, a pair of terminals 10,12 are illustrated for connection to a conventional source of utility power at 110 volts a.c. or the like. A power supply 14 is connected to terminal 10 and supplies a regulated d.c. voltage to a bus 16. Terminal 12 is connected to electrical ground. A pair of thermistors 18,20 are connected in series across power supply 14 between bus 16 and ground. Thermistor 18 is preferably disposed on a solar collector so as to be responsive to the temperature of the energy transport fluid in the collector either directly as by being disposed within a fluid conduit or indirectly as by being disposed externally of the fluid conduit but in heat transfer relationship thereto. Similarly, thermistor 20 is disposed to be responsive to fluid temperature at a location remote from the solar connector such as in a storage tank. Thermistors 18,20 have the usual negative resistance-temperature coefficient, which is to say that the electrical resistance of the respective thermistors decreases as a function of increasing temperature. Preferably, thermistor 18 is connected to bus 16 and thermistor 20 is connected to ground as illustrated in the drawing.

An adjustable resistor 22 is connected across thermistor 20 and has a slide wire 24 connected to one input 28 of a NAND-gate Schmitt trigger 26. A second input 30 of trigger 26 is connected to bus 16 such that the trigger output 32 is inversely responsive to input 28. Output 32 is connected through the series combination of an adjustable resistor 34 and the cathode-anode junction of a diode 36 to input 28. A PNP transistor 38 has an emitter connected to bus 16, a base connected through a resistor 40 to trigger output 32 and a collector connected through a filter capacitor 42 to ground. A resistor 44 is connected across the base-emitter junction of transistor 38. The collector of transistor 38 is connected through a resistor 46 to the gate terminal of a thyristor 48, specifically a triac. The primary conducting electrodes of triac 48 are connected to ground and through a fluid pump 50 to a.c. power terminal 10. A neon lamp 52 and a resistor 54 are connected across pump 50 to indicate pump energization and operation.

In operation, the junction of thermistors 18,20 varies as a function of fluid temperature differential between the solar collector and the storage tank. Specifically, as the temperature at the collector increases relative to that at the storage tank, the resistance of thermistor 18 decreases relative to that of thermistor 20, and the voltage at the thermistor junction increases accordingly. Resistor 22 is preadjusted such that trigger input 28 reaches the Schmitt trigger threshold at a preselected temperature differential between the collector and tank, such as a differential of 20° F., for example. When the temperature differential reaches this threshold level, trigger output 32 switches from a high to a low voltage state and draws current through diode 36 and resistor 34 from trigger input 28. This current drain draws the voltage at input 28 below the switch-off threshold of trigger 26, such that trigger output 32 switches back to a high voltage state. The voltage at input 28 then increases rapidly to the switch-on threshold level such that the sequence is repeated. Thus, trigger 26, in combination with negative feedback resistor 34 and diode 36, comprises a high frequency oscillator having an output signal frequency determined by the circuit components, preferably in the range of seven to eight megahertz. The amplitude or envelope of the high frequency signal at output 32 varies as a function of the temperature differential indicated by thermistors 18,20.

The control signal at output 32 is half-wave rectified by transistor 38 and filtered by capacitor 42 to provide a d.c. signal through resistor 46 to the gate electrode of triac 48. As the amplitude of the signal at output 32 increases, indicating an increased temperature differential, the voltage across capacitor 42 reaches the trigger threshold of triac 48, such that pump 50 is effectively connected through the triac across a.c. input terminals 10,12. As the collector fluid temperature indicated by thermistor 18 decreases and/or the storage fluid temperature indicated by thermistor 20 increases, the voltage at the termistor junction decreased. At a preselected second temperature threshold less than the first temperature threshold, oscillation at Schmitt trigger 26 is inhibited. Preferably, the turnoff threshold is adjusted by means of resistor 34 such that transfer of fluid from the collector to the storage tank is inhibited when fluid temperature at the storage tank is greater than that at the collector.

Although the presently preferred embodiment of the invention illustrated in the drawing has been described in connection with transfer of fluids, specifically water, from a collector to a storage tank, it will be appreciated that the fluid could be transported to other remote locations, such as a space heater or a hot water tap, without departing from the scope of the invention. Energy transport fluids other than water, such as air, are contemplated. Similarly, triac 48 may be readily replaced by other solid state or electro-magnetic equivalent switches without departing from the scope and spirit of the invention. In some applications, resistor 34 may be replaced by an adjustable resistor or eliminated entirely. Indeed, the invention is intended to embrace the above-noted and all other alternatives, modifications and variations as fall within the spirit and broad scope of the appended claims.

The invention claimed is:

1. In a solar heating system, a circuit for controlling electrical apparatus as a function of temperature comprising first and second temperature sensitive means each having an electrical conductance which varies as a function of temperature, means connecting said first and second means in series across a source of electrical power such that a voltage at the junction between said first and second means varies as a function of a differential in temperatures sensed by said first and second means, a negative feedback high frequency oscillator responsive to said temperature differential to provide a high frequency signal having an amplitude which varies as a function of said temperature differential, and switch means responsive to said amplitude of said high frequency signal for controlling a fluid transfer pump in a solar heating system as a function of said temperature differential.

2. The circuit set forth in claim 1 wherein said oscillator comprises an inverting Schmitt trigger having an input operatively connected to said first and second temperature senstive means and feedback means connecting the output of said Schmitt trigger to said input.

3. The circuit set forth in claim 2 wherein said feedback means comprises impedance means and rectifier means connected in series with said impedance means.

4. A circuit for controlling fluid transport in a solar energy heating system comprising first thermistor means adapted to be responsive to temperature of energy transport fluid in a solar energy collector, second thermistor means adapted to be responsive to fluid temperature at a second fluid station, means connecting said first and second thermistor means in series across a source of electrical power such that voltage at the junction of said first and second thermistor means varies as a function of a temperature differential between said sensed fluid temperatures, adjustable third resistance means electrically connected across one of said thermistor means, Schmitt trigger means having an input connected to said adjustable third resistance means and responsive to said temperature differential signal to provide an output which switches from a first voltage state to a second voltage state when said temperature differential signal indicates that the sensed fluid temperature at said collector exceeds that at said second station by a preselected first temperature differential threshold, said output switching from said second state back to said first state when said temperature differential signal is at a second threshold less than said first threshold by a preselected threshold differential, a fluid pump adapted when energized to pump fluid from said collector to said second station, and switch means responsive to said output of said Schmitt trigger means to energize said fluid pump in said second voltage state of said output and to de-energize said pump in said first voltage state of said output, said third resistance means being adjustable conjointly to vary both said first and second differential thresholds without affecting said threshold differential.

5. The circuit set forth in claim 4 wherein said Schmitt trigger means comprises a negative feedback high frequency oscillator having an output voltage which varies as a function of said temperature differential.

6. The circuit set forth in claim 5 wherein said switch means includes filter means for developing a control signal as a function of said high frequency output voltage and means responsive to said control signal for energizing said pump.

7. The circuit set forth in claim 6 wherein said filter means comprises a filter capacitor, and wherein said means responsive to said control signal comprises a thyristor having a control terminal operatively connected to said filter capacitor.

8. The circuit set forth in claim 7 wherein said thyristor comprises a triac.

* * * * *